United States Patent
van den Berg et al.

(10) Patent No.: US 6,520,113 B2
(45) Date of Patent: Feb. 18, 2003

(54) DEVICE FOR SUPPLYING FODDER TO ANIMALS

(75) Inventors: Karel van den Berg, Bleskensgraaf (NL); Lucien Eliza Niels Voogd, Leerdam (NL); Howard Sie, Rotterdam (NL)

(73) Assignee: Lely Enterprises A.G.

( * ) Notice: Subject to any disclaimer, the term of this patent is extended or adjusted under 35 U.S.C. 154(b) by 0 days.

(21) Appl. No.: 10/058,795

(22) Filed: Jan. 30, 2002

(65) Prior Publication Data

US 2002/0108580 A1 Aug. 15, 2002

(30) Foreign Application Priority Data

Feb. 12, 2001 (NL) .............................................. 1017337

(51) Int. Cl.[7] ........................... A01K 61/02; A01K 5/00
(52) U.S. Cl. .................................. 119/57.2; 119/57.92
(58) Field of Search ............................... 119/57.2, 57.4, 119/57.5, 57.7, 57.92

(56) References Cited

U.S. PATENT DOCUMENTS

| | | | | |
|---|---|---|---|---|
| 3,625,183 A | * | 12/1971 | Tartar | 119/57.2 |
| 3,717,127 A | * | 2/1973 | Porterfield | 119/57.7 |
| 4,850,307 A | * | 7/1989 | Sheets | 119/57.2 |
| 5,718,188 A | * | 2/1998 | Erickson | 119/57.7 |
| 6,200,017 B1 | * | 3/2001 | van den Berg | 119/57.5 |
| 6,360,691 B1 | * | 3/2002 | Laue et al. | 119/57.92 |

* cited by examiner

Primary Examiner—Charles T. Jordan
Assistant Examiner—Elizabeth Shaw
(74) Attorney, Agent, or Firm—Penrose Lucas Albright

(57) ABSTRACT

A device for supplying fodder to animals such as cows which has a plurality of hoppers containing fodder wherein each hopper may have a different type of fodder. A plurality of feeding troughs are provided which are accessible to animals to feed therefrom. Each hopper has a conveyor for conveying fodder from that hopper to a control component that has a receptacle which receives fodder from selected hoppers. Under control of the control component selected conveyors in the hoppers convey predetermined amounts of fodder therefrom to the receptacle. The receptacle has a bottom which can be opened and from which fodder falls through a pipe or chute to a selected trough. The device is provided with a container which may be one of the hoppers edible separating material which may be supplied to the receptacle to form a layer on top of which fodder is received and is wrapped, at least in part, by the edible separating material as it falls through the bottom of the receptacle into the underlying pipe or chute. The control component includes a memory that contains data as to the adhesiveness of the fodder contained in each of the hoppers and causes fodder to be conveyed to the receptacle and therefrom in the order of increasing adhesiveness thereof. The edible separating material is a material that at least substantially does not adhere to components of the device with which it comes into contact.

16 Claims, 1 Drawing Sheet

DEVICE FOR SUPPLYING FODDER TO ANIMALS

FIELD OF THE INVENTION

The invention relates to a device for supplying fodder to animals, such as cows, which has a hopper for fodder and a feeding trough accessible to the animals. A receptacle receives fodder from the hopper via a first conveyor which receptacle is connected to the feeding trough via a second conveyor.

BACKGROUND OF THE INVENTION

Such a device is known from Dutch Patent Application No. 1010898 of van den Berg which was published Jun. 27, 2000. Although this known device delivers fodder to the trough, in practice to guarantee proper sanitary conditions of the device, it must be cleaned on a regular basis which takes much time, entails costs, and the device cannot be used during cleaning.

SUMMARY OF THE INVENTION

It is an object of the invention to obviate the drawbacks related to the cleaning at least partially.

For this purpose a device for supplying fodder to animals of the above-described type according to the invention comprises the introduction of edible separating material into the system, the edible separating material being a material that at least substantially does not adhere to components of the device. The invention is based on the insight that, in particular when there is supplied rather wet or sticky fodder by the known device, parts of the fodder remain on components of the device, such as the receptacle which receives the fodder or the conveying means, and contaminate them, so that regular cleaning of the device is necessary. By first wrapping up the fodder, according to the invention, in at least substantially non-sticky, edible separating material, contamination of the device is considerably reduced, and the frequency that cleaning is required is drastically reduced.

It is in particular advantageous when the edible separating material is constituted by an amount of dry fodder, corn, for example. However, the edible separating material is preferably constituted by grass.

An embodiment of a device according to the invention is characterized in that a receptacle for receiving the fodder is provided with a weighing device for measuring fodder present in the receptacle, and by means of said weighing device it is possible to establish the amount of fodder that can be supplied to the feeding trough via a second conveyor.

In a preferred embodiment the second conveyor is a fall pipe or a fall chute. In this case, the receptacle is located above the feeding trough. Consequently, there is no separate drive mechanism required for conveying the fodder, because gravity causes the fodder to flow to the feeding trough.

Although the fodder can be taken out of the receptacle by means of a separate removal device, for the sake of simplicity, it is advantageous that a separate device not be provided for removal purposes. A tiltable receptacle may be used whereby fodder falls from said receptacle after it has been tilted. However, for improving the hygienic use of the device, the receptacle has preferably a bottom which is adapted to be opened and is preferably provided with a control means for controlling the opening of the bottom.

An extremely hygienic use of the device according to the invention is obtained when the receptacle has such a shape that, when a package of fodder and edible separating material falls through the bottom, the edible separating material surrounds the fodder at least partially. In this situation there may be, in particular receptacles that narrow in downward directions.

A device according to the invention can be applied inter alia to troughs in milking compartments having milking robots. However, the invention is in particular advantageous when the device is constituted by a feeding column, in which situation several animals can use the device at the same time. For that purpose the feeding column is provided in a manner known per se with various feeding troughs disposed side by side for example.

A compact device is obtained when the feeding column is provided with a framework located around the central axis, to which framework or at least substantially to such framework, the feeding troughs and hoppers are fitted.

A preferred embodiment of a device according to the invention is characterized in that the device is provided with identification means for identifying individual animals, so that the device can function automatically. For feeding animals by means of the device, an individual animal is identified, after which the fodder is composed with the aid of a metering device from ingredients originating from one or more hoppers, according to the nutritive need of the individual animal, and the fodder is supplied to the feeding trough via the receptacle and the conveying means. By means of the weighing device the amount of fodder can be adjusted to the nutritive needs of the individual animal. In this situation the control means preferably controls the functioning of the relevant components of the device.

A preferred embodiment of a device according to the invention is characterized in that the device comprises various hoppers, each for containing stock of a particular kind of fodder, and in that the device is provided with a control means, said control means comprising a memory with a correspondence table with values that relate to the adhesiveness factor of various types of fodder, the control means controlling the device in such a manner that the various types of fodder are supplied to the receptacle in the order of increasing adhesiveness factor. Thus, with the aid of the control means the least adhesive fodder is supplied to the receptacle first. The device according to the invention has the additional advantage of enabling the wrapping of the fodder with minerals or medicines or both. These are preferably added last to the fodder, so that the medicines or minerals or both stick to the most adhesive fodder and will be delivered at a high degree of certainty into the feeding trough where they can be consumed by the animal.

BRIEF DESCRIPTION OF THE DRAWINGS

The invention will now be further disclosed with reference to the embodiment shown in the drawing in which.

DETAILED DESCRIPTION OF THE PREFERRED EMBODIMENTS

Figure 1:
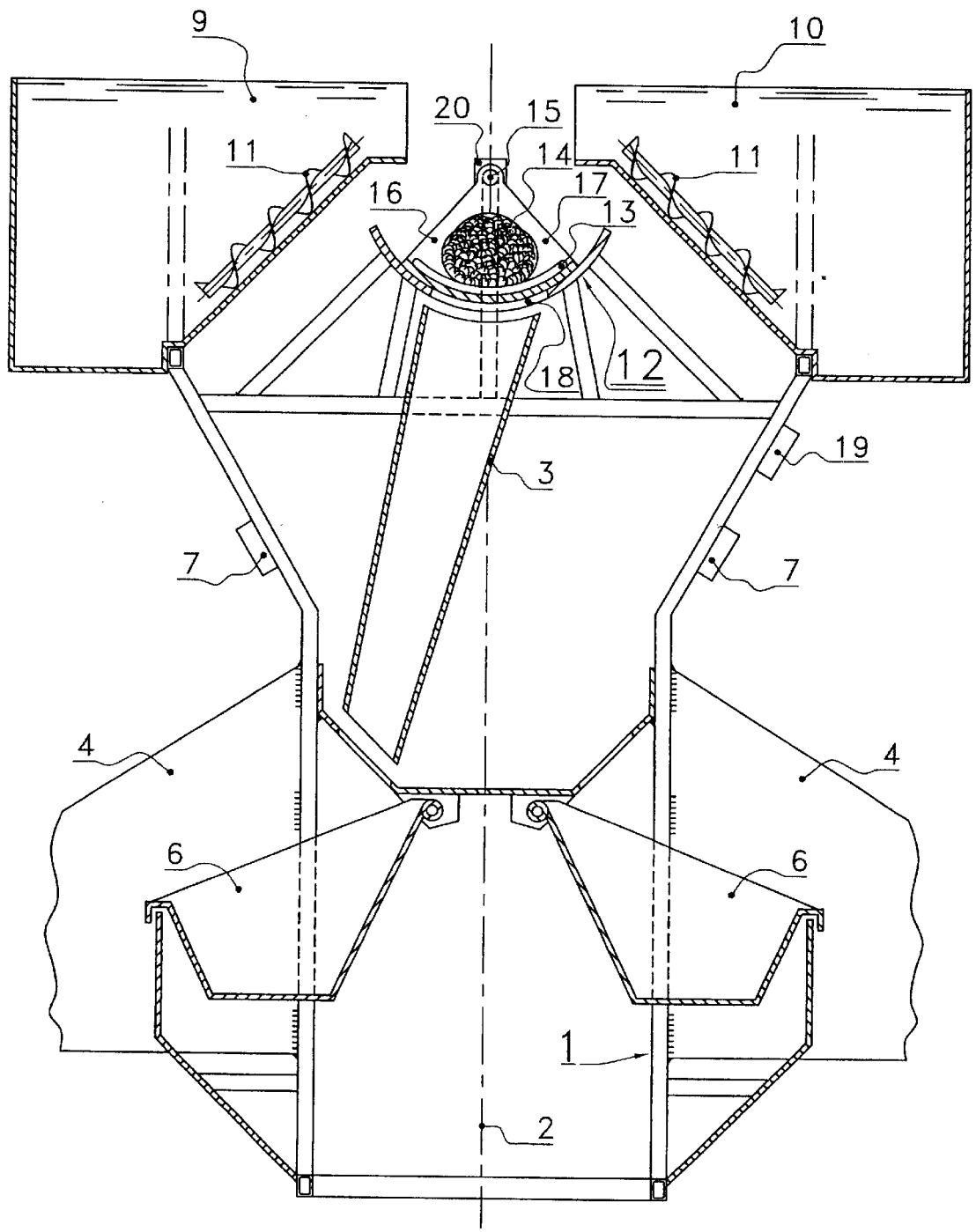
FIG. 1 is a schematic cross-sectional elevational view of an embodiment according to the invention.

In the embodiment shown in FIG. 1, a framework I is disposed around a central axis 2, said framework 1 having a substantially circular circumference. At the upper side of framework 1 there are provided hoppers 9 and 10. For that purpose facilities which are not further shown are fitted to framework I for the placement of the hoppers 9 and 10.

Framework 1 may be provided with partition walls 4 that are detachably fitted to framework 1.

Feeding troughs 6 for the animals are disposed in circular arrangement in the lower part of the device. As a result of the geometry of the device, in the embodiment shown constituted by a feeding column, the construction occupies relatively little space, while the accessibility of the feeding column to the animals is optimal from all directions.

The feeding column is further provided with conveying means comprising a first conveyor 11 and a second conveyor 3 for conveying fodder from hoppers 9 and 10 to the relevant feeding trough 6. A receptacle 12, centrally arranged in the embodiment shown, receives an amount of fodder which is conveyed by first conveyor 11 from hopper 9 or 10 to receptacle 12. As a first conveyor 11, an auger, gripper, belt conveyor or any other device for conveying fodder may be used.

A second conveyor 3, preferably constituted by a fall pipe or a fall chute, is adapted to convey fodder from receptacle 12 to the relevant feeding trough 6. For the purpose of conveying the fodder to the relevant feeding trough 6, it is advantageous for the fall pipe 3 to be rotatably mounted in the feeding column.

According to the invention the feeding column is provided with a container which, in the embodiment shown, is hopper 10, for containing at least substantially non-sticky, edible separating material. Said separating material may be dry fodder, in particular grass.

First conveyor 11 supplies a certain amount of said separating material to receptacle 12, where it will be situated as a kind of bed 13 on the bottom of receptacle 12.

When bed 13 has been laid on the bottom, first conveyor 11 of hopper 9 is activated to supply a certain amount of rather sticky or wet fodder to the receptacle, where said amount of fodder 14 will be situated on bed 13.

For the purpose of conveying the package consisting of bed 13 and the amount of fodder 14 to the fall pipe 3, receptacle 12 is provided with a bottom which is adapted to be opened. In the embodiment shown this is accomplished in that the bottom of receptacle 12 has two halves 16 and 17 which are hingeable about an axis 15. When halves 16 and 17 move away from each other, there is thus created a fall opening 18 through which the package falls into fall chute 3.

The device comprises a control means 19 for controlling the opening of the bottom. Preferably said control means 19 also controls the operation sequence of the first and second conveyors 11 and 3, so that first the edible separating material and then the amount of fodder is received by receptacle 12.

Due to the fact that the predetermined amount of fodder 14 lies on bed 13 of a separating material, such as a grass bed, in the case that the fodder is sticky, at least substantially no parts of fodder will adhere to the components of the device that thereafter come into contact with the fodder. Moreover, the animals find the package of fodder and separating material agreeable to eat.

An extremely hygienic use of the device according to the invention is obtained when receptacle 12 has such a shape that, when the package of fodder 14 and bed 13 of edible separating material falls through its bottom, bed 13 of edible separating material surrounds fodder 14 at least partially. In this situation the packages may be, in particular by receptacles 12, narrowed as they move downwardly. A desired shape can be determined simply by standard trial and error experiments.

Identification means 7 are provided for identifying an individual animal. In the embodiment shown, identification means 7 are attached to framework 1, but they may also be disposed at other places, such as at feeding troughs 6. With the aid of identification means 7 the identity of an animal near a feeding trough 6 is automatically established. By means of correspondence tables stored in the memory of control means 19 the amount of fodder destined for that animal can be supplied. By means of a weighing device 20, this amount can be determined. With the aid of data from the animal identification means 7, control means 19 further controls the movement of fall pipe 3 so that the latter is located above the correct feeding trough 6. Control means 19 further controls the drives of conveyors 11.

When there are provided various hoppers, each for containing stock of a particular type of fodder, by means of a data stored in its memory which relate to values to the adhesiveness of each type of fodder, the particular sequence that fodder types are provided can be controlled. Thus to the extent that which each type of fodder adheres, control means 19 can control the device in such a manner that types of fodder are supplied to the receptacle in the order of increasing adhesiveness. Moreover, the amount of dry fodder to be added can correspond to the adhesiveness of the type of fodder to be supplied.

Although we have disclosed the preferred embodiments of our invention, it is to be understood that it is capable of other adaptations and modifications within the scope of the following claims.

Having thus disclosed our invention, what we claim as new and to be secured by Letters Patent of the United States of America is:

1. A device for supplying fodder (13, 14) to animals, such as cows, the device being provided with:

a hopper (9, 10) for containing a stock of fodder (13, 14), a feeding trough (6) which is accessible to an animal, conveying means (3, 11) for conveying fodder (13, 14) from the hopper (9, 10) to the feeding trough (6), and a receptacle (12), the conveying means comprising a first conveyor (11) for conveying an amount of fodder (13, 14) from the hopper (9, 10) to the receptacle (12) and a second conveyor (3) for conveying the amount of fodder (13, 14) from the receptacle (12) to the feeding trough (6), characterized in that the device is provided with a container (10) for containing edible separating and/or packaging material (13), with supply means (11) for supplying the edible separating material (13) to the receptacle (12), and in that the device comprises a control means (19) for first performing the supply of the edible separating material (13) to the receptacle (12) and then performing the conveyance of fodder (14) from the hopper (9) to the receptacle (12), the edible separating material (13) being constituted by a material that at least substantially does not adhere to components of the device.

2. A device as claimed in claim 1, characterized in that the edible separating material (13) is constituted by an amount of dry fodder.

3. A device for feeding animals which comprises: a feeding trough which is accessible to the animals; conveying means which is disposed above said feeding trough; supply means for supplying said conveying means with an edible separating material and other edible food for said animals; and control means for substantially wrapping said other food with said edible separating material, said edible separating material being composed of material that at least substantially does not adhere to components of the device over which it is moved and where it is received, said conveying means conveying said wrapped material to said trough.

4. A device in accordance with claim 3, wherein said edible separating material is composed of a dry fodder.

5. A device in accordance with claim 3, wherein said edible separating material is composed of grass.

6. A device in accordance with claim 3, wherein said control means comprises a receptacle which is provided with a weighing means for determining the amount of fodder in said receptacle.

7. A device in accordance with claim 3, wherein said conveying means comprises a fall pipe.

8. A device in accordance with claim 3, wherein said conveying means comprises a fall chute.

9. A device in accordance with claim 3, wherein said control means comprises a receptacle which has a bottom that is adapted to be opened.

10. A device in accordance with claim 9, wherein said control means controls the amount of opening of said bottom of said receptacle.

11. A device in accordance with claim 10, wherein said receptacle and said opening are so shaped that when said edible separating material is received in said receptacle with said other food thereon and said edible separating material with said other material thereon falls through said opening in said bottom, said edible separating material surrounding said other food at least in part.

12. A device in accordance with claim 3, which comprises a feeding column.

13. A device in accordance with claim 12, wherein said feeding column comprises a framework which is disposed around a central axis, said trough and a plurality of further troughs and a plurality of hoppers being supported by said framework.

14. A device in accordance with claim 3, which further comprises identification means for identifying an individual animal that is present at said trough.

15. A device in accordance with claim 3, wherein said supply means comprises a plurality of hoppers, each of said hoppers containing a different consumable material including said edible separating material and said other food, said control means comprising a memory containing data of the adhesiveness factors of each said material in said hopper, said control means further comprising a receptacle which receives materials from said hoppers and transmits them to said conveying means, said control means supplying said materials to said receptacle in an order of increasing adhesiveness.

16. A device for feeding animals which comprises a plurality of hoppers, each said hopper containing a different fodder having a different adhesiveness, a plurality of feeding troughs which are accessible to said animals, control means for selectively receiving fodder from said hoppers and conveying said selected fodder to a selected said feeding trough, said control means comprising a memory of the adhesiveness value of the fodder in each of said hoppers, said control means selecting and conveying said fodders from said hoppers to said feeding troughs in an order of increasing adhesiveness.

* * * * *